(12) United States Patent
Weng et al.

(10) Patent No.: US 10,513,024 B1
(45) Date of Patent: Dec. 24, 2019

(54) TRANSMISSION SYSTEM AND ELECTRIC TOOL PROVIDED WITH SAME

(71) Applicant: Zhejiang Minglei Tools Industry Co., LTD., Ningbo, Zhejiang (CN)

(72) Inventors: Lei Weng, Zhejiang (CN); Zhi Ouyang, Zhejiang (CN)

(73) Assignee: Zhejiang Minglei Tools Industry Co., LTD., Ningbo (CN)

( * ) Notice: Subject to any disclaimer, the term of this patent is extended or adjusted under 35 U.S.C. 154(b) by 15 days.

(21) Appl. No.: 16/114,250

(22) Filed: Aug. 28, 2018

(30) Foreign Application Priority Data

Jun. 21, 2018 (CN) .......................... 2018 1 0646354

(51) Int. Cl.
| | |
|---|---|
| *B25F 5/00* | (2006.01) |
| *F16H 61/686* | (2006.01) |
| *F16H 3/56* | (2006.01) |
| *F16H 3/72* | (2006.01) |
| *F16H 57/023* | (2012.01) |
| *F16H 1/28* | (2006.01) |

(52) U.S. Cl.
CPC ............ *B25F 5/001* (2013.01); *F16H 1/2818* (2013.01); *F16H 3/56* (2013.01); *F16H 3/72* (2013.01); *F16H 57/023* (2013.01); *F16H 61/686* (2013.01); *F16H 2200/2007* (2013.01); *F16H 2200/2097* (2013.01)

(58) Field of Classification Search
CPC .......... B25F 5/001; F16H 1/2818; F16H 3/56; F16H 3/72; F16H 57/023; F16H 61/686
See application file for complete search history.

(56) References Cited

U.S. PATENT DOCUMENTS

| | | | |
|---|---|---|---|
| 2013/0053208 A1* | 2/2013 | Chen ....................... | B25F 5/001 475/302 |
| 2014/0080659 A1* | 3/2014 | Elger ...................... | B25F 5/001 475/337 |

FOREIGN PATENT DOCUMENTS

CN          202137745 U       2/2012

* cited by examiner

*Primary Examiner* — Mark J Beauchaine (57) ABSTRACT

Provided herein is a transmission system including: a housing; a pair of double-layered gears for transmitting a power from a motor to a screw driver shaft defining a transmission axis, the pair of gears including a first bigger gear and a first smaller gear; a torque cup for covering a leading end portion of the housing through which the shaft is extended from the housing; a first set of planetary gears for driving the shaft, regularly surrounding and meshing the first smaller gear; and a first ring gear for sliding axially against the housing and meshing the first bigger gear and/or the first set of planetary gears; wherein the torque cup can be turned to force the first ring gear to slide axially.

6 Claims, 14 Drawing Sheets

TRANSMISSION SYSTEM AND ELECTRIC TOOL PROVIDED WITH SAME

CROSS-REFERENCE TO RELATED APPLICATIONS

The present application claims priority of Chinese Patent Application No. 201810646354.1, filed on Jun. 21, 2018 in the State Intellectual Property Office of China, the entire contents of which are hereby incorporated by reference.

TECHNICAL FIELD

The invention relates to an electric tool, in particular to a transmission system and an electric tool provided with same.

BACKGROUND ART

Transmission system is one of the main core components of an electric tool, and its main function is to provide the power needed for the electric tool to rotate. Existing electric tools all have multiple functions for the convenience of use, that is, they can be used for drilling and screwing at the same time.

In order to realize the above-mentioned operation functions, enterprises also make some structural improvements to the transmission system during transmission system production, i.e. the transmission system is equipped with a speed change mechanism and a torque cup at the same time, so as to switch between various functions.

For example, the Chinese patent application number 201120271287.3 discloses an improved structure for high-speed and low-speed switch of an electric tool, and a shift lever of the improved structure is driven by a shift frame which is directly exposed outside a transmission system housing for operation by workers. In this way, workers are likely to come into contact with the shift frame unintentionally during operation, thus increasing the probability of misoperation. When the electric tool works under the condition of large torque, if the rotating speed increases instantaneously, it is easy to cause damage to a transmission shaft.

SUMMARY OF THE INVENTION

Therefore, the invention provides A transmission system, comprising:
  a housing;
  a pair of double-layered gears for transmitting a power from a motor to a mounting shaft for clasping a screw driver bit or a drill bit and defining a transmission axis, the pair of double-layer gear comprising a first outer or bigger gear and a first inner or smaller gear;
  a torque cup mounted to the housing to cover an leading end portion of the housing through which the mounting shaft is extended partially outside the housing;
  a first set of planetary gears for driving the mounting shaft, circumferentially regularly surrounding and meshing the first inner gear,
  a first ring gear fixed circumferentially and relatively to the housing so that it can slide axially to mesh both of the first outer gear and the first set of planetary gears or only the former;
  wherein the torque cup is configured so that it can be turned to force the first ring gear to slide axially.

Preferably, the first ring gear is surrounded with a gear sleeve, and the gear sleeve and the first ring gear are axially locked; and the torque cup can be turned to force the gear sleeve to slide axially.

Preferably, the transmission system further comprises:
  a sun gear ratatable around the transmission axis and having an axial end fixed with a plurality of axial stubs each of which co-axially supports one of the first set of planetary gears for rotation around itself; and
  a second set of planetary gears for driving the mounting shaft, meshing inwards with the sun gear and outwards with a second ring gear, which is mounted to the housing for a rotation restrained with respect to the housing.

Most preferably, the second ring gear is provided with an axial and endless profile or cam which is urged against the housing.

The invention relates also to an electric tool comprising such a transmission system.

Reference Numerals: 1. housing; 1a. front housing body; 1a1. guide hole; 1a2. second limiting block; 1b. rear housing body; 1b1. first blind hole; 1c. bottom cover; 1c1. through hole; 1d. front cover; 1d1. limiting hole; 2. second planetary gear set; 3. second inner gear; 4. double-layer gear; 4a. first outer ring gear; 4b. first inner ring gear; 5. first planetary gear set; 6. first inner gear; 7. gear sleeve; 7a. fixing block; 7b. lifting pin; 7b1: spherical surface; 7b2: tapered; 7c. biasing spring; 8a. lug; 8b. sliding groove; 9. torque cup; 9a. inner edge; 9b. protrusion; 9b1. concave cambered surface; 9b2. tapered groove; 9c. steel ball; 9d. second extension spring; 9e. second blind hole; 10. sun gear; 10a. disc; 10b. second inner ring gear; 11. third planetary gear set; 12. third inner ring gear; 12a. projection; 13. transmission ring; 13a. first limiting block; 14. mounting shaft; 15. shaft sleeve; 15a. clamping block; 16. thread bushing; 16a. first spring; 17. torque washer; 17a. teeth; 17b. lifting rod; 17c. ball.

DETAILED DESCRIPTION OF THE INVENTION

The invention will be described in further detail below with reference to the accompanying drawings.

Embodiment 1

Figure 1:
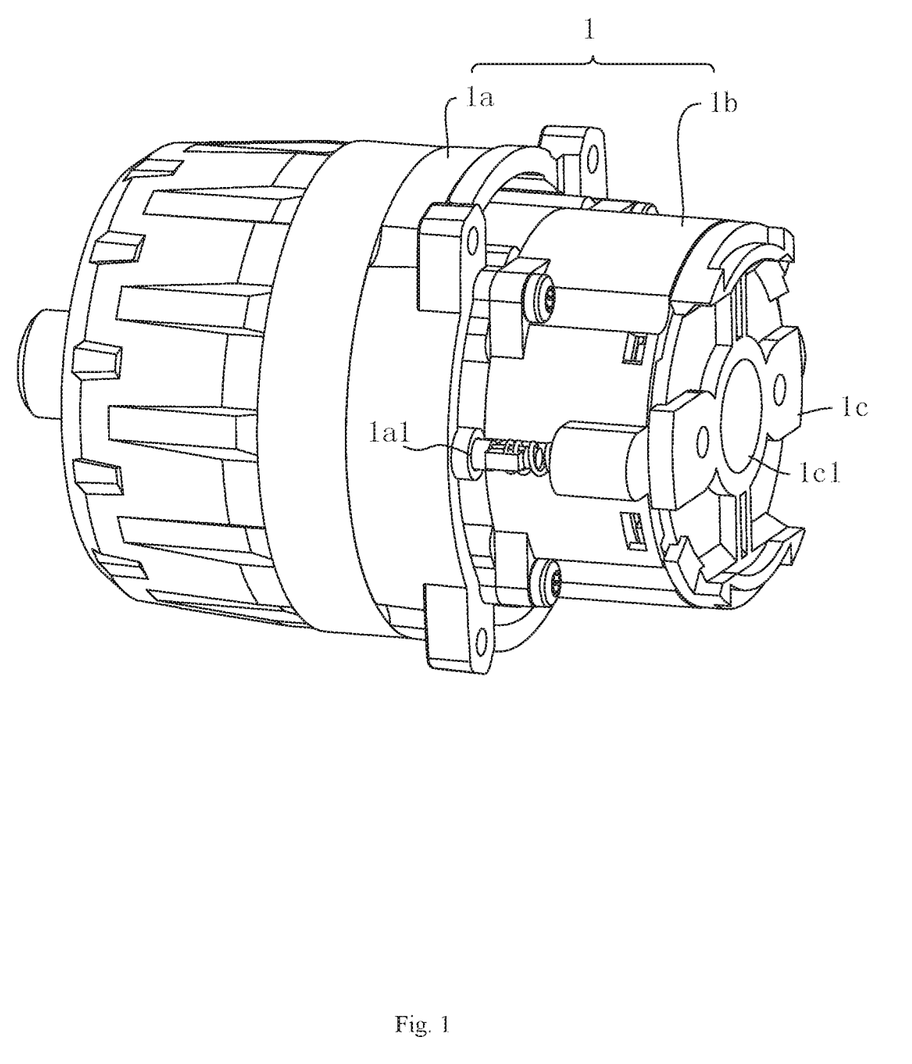
FIG. 1 is a schematic structural diagram of a transmission system according to embodiment 1.
Figure 2:
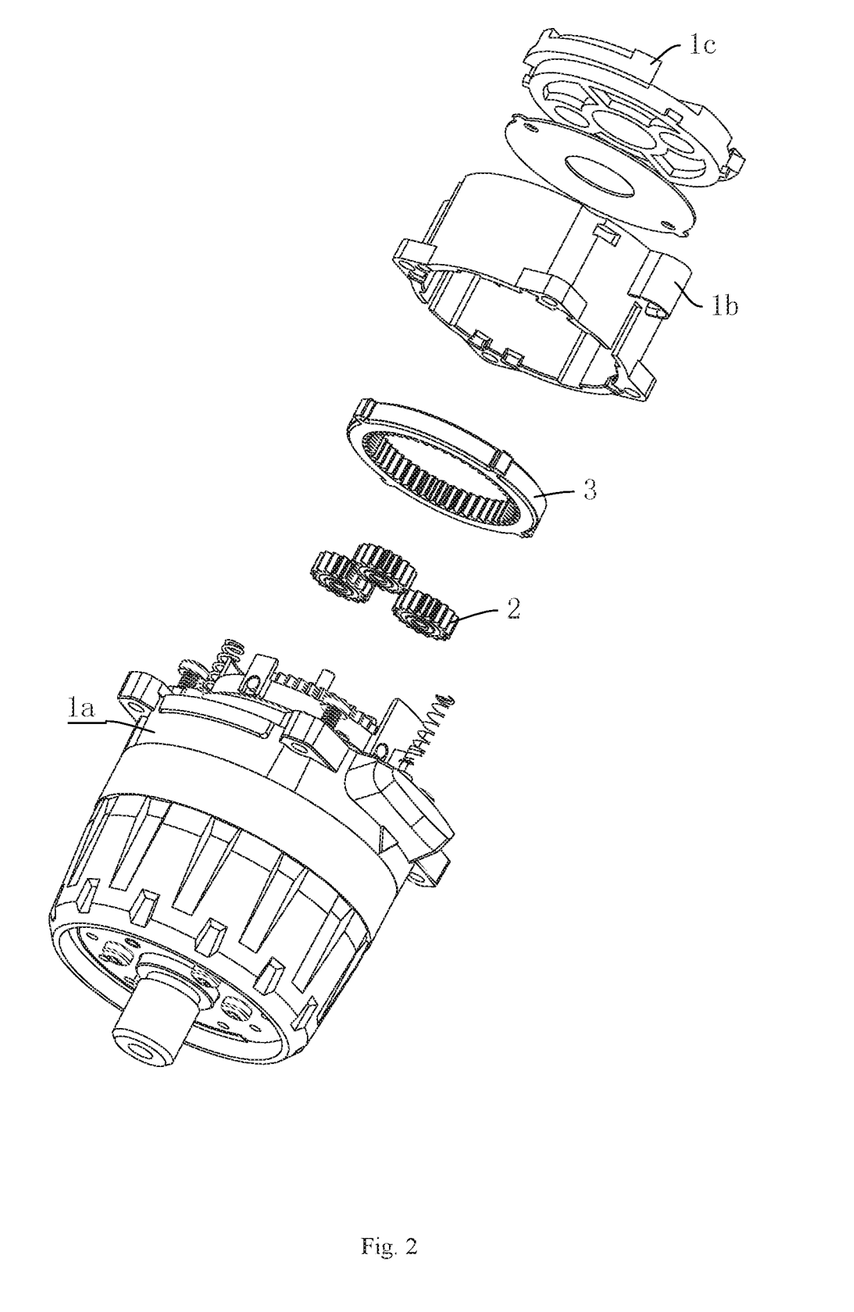
FIG. 2 is a first explosive view of the transmission system according to embodiment 1.

A transmission system, as shown in FIG. 1 and FIG. 2, comprises a housing 1 which is divided into a front housing body 1a and a rear housing body 1b, the rear portion of the rear housing body 1b is provided with a bottom cover 1c, and the center of the bottom cover 1c is provided with a through hole 1c1 through which an output shaft of a motor can pass. The rear housing body 1b is internally provided with a second planetary gear set 2 which is attached to the bottom cover 1c, and planetary gears of the second planetary gear set 2 are uniformly distributed around the through hole 1c1 and can mesh with the output shaft of the motor. The number of the planetary gears in the second planetary gear set 2 can be selected according to the actual situation, and here it is three. In addition, the second planetary gear set 2 is further sleeved with a second inner gear 3, and the second inner gear 3 is fixed to the rear housing body 1b.

Figure 3:
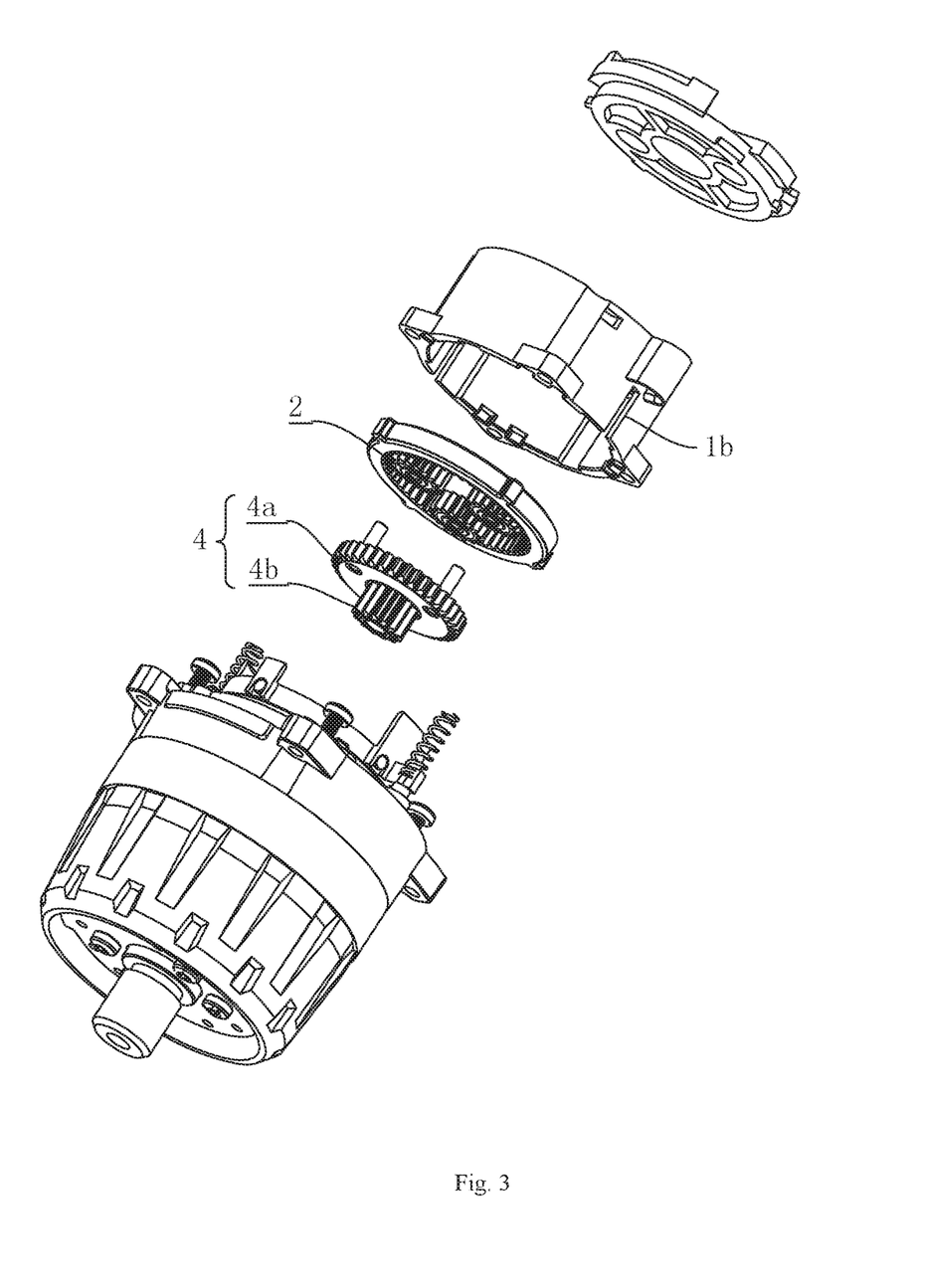
FIG. 3 is a second explosive view of the transmission system according to embodiment 1.

Furthermore, as shown in FIG. 3, the rear housing body 1b is further provided with a double-layer gear 4 inside. Shafts of the planetary gears of the second planetary gear set 2 are fixed to a first outer ring gear 4a of the double-layer gear 4 and are also uniformly distributed around the center of the double-layer gear 4. While a first inner ring gear 4b of the double-layer gear 4 is located on the side, away from the second planetary gear set 2, of the first outer ring gear 4a. Here, the center of the double-layer gear 4 is coaxial with the through hole 1c1.

Figure 4:
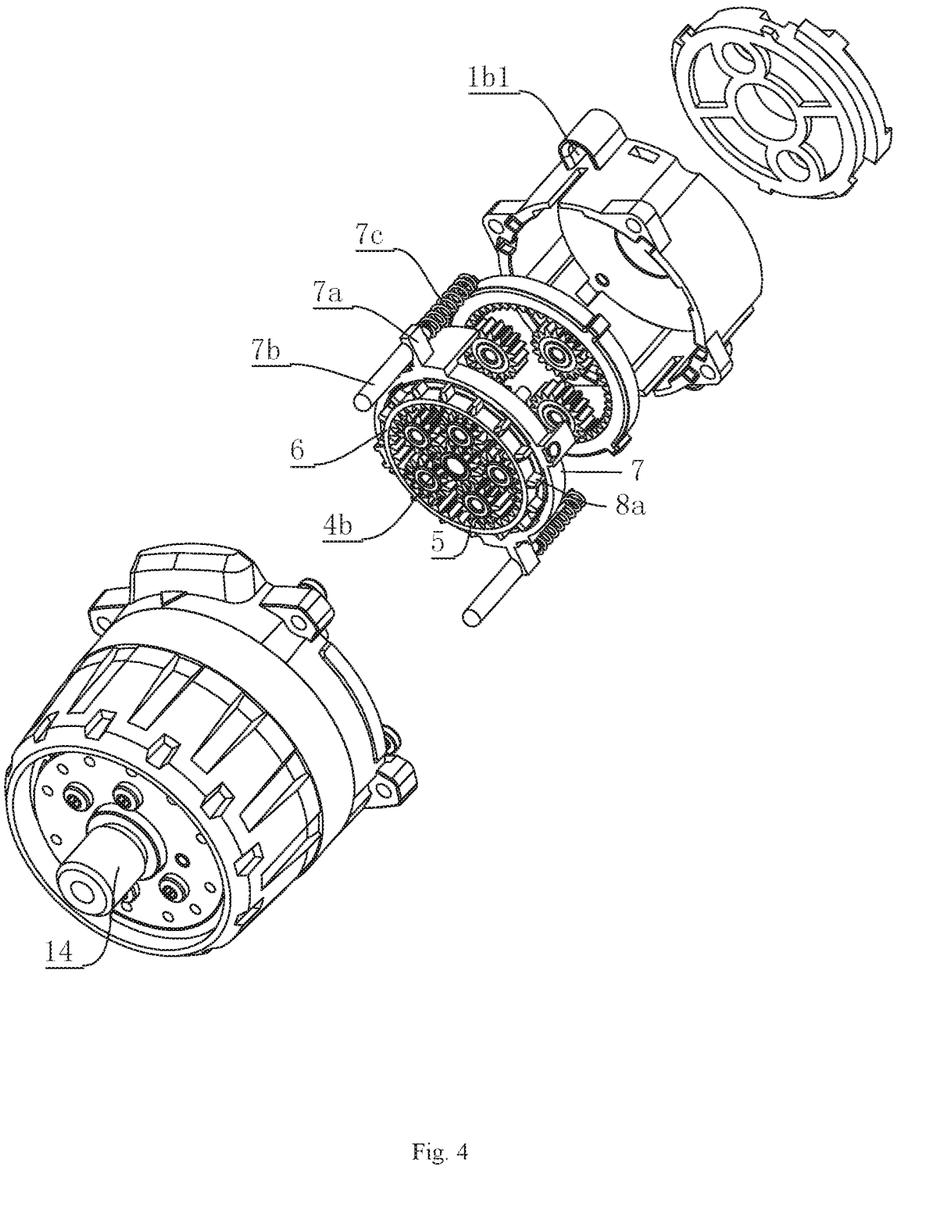
FIG. 4 is a third explosive view of the transmission system according to embodiment 1.

Besides, as shown in FIG. 4, a first planetary gear set 5 is evenly distributed around the first inner ring gear 14b, and the first planetary gear set 5 can indirectly drive a mounting shaft 14 for mounting a drill bit or a screwdriver. Also, each planet gear of the first planetary gear set 5 meshes with the first inner ring gear 4b. At the same time, the first planetary gear set 5 and the first outer ring gear 4a are sleeved with a same first inner gear 6, and the first inner gear 6 can slide between the first planetary gear set 5 and the first outer ring gear 4a.

Figure 5:
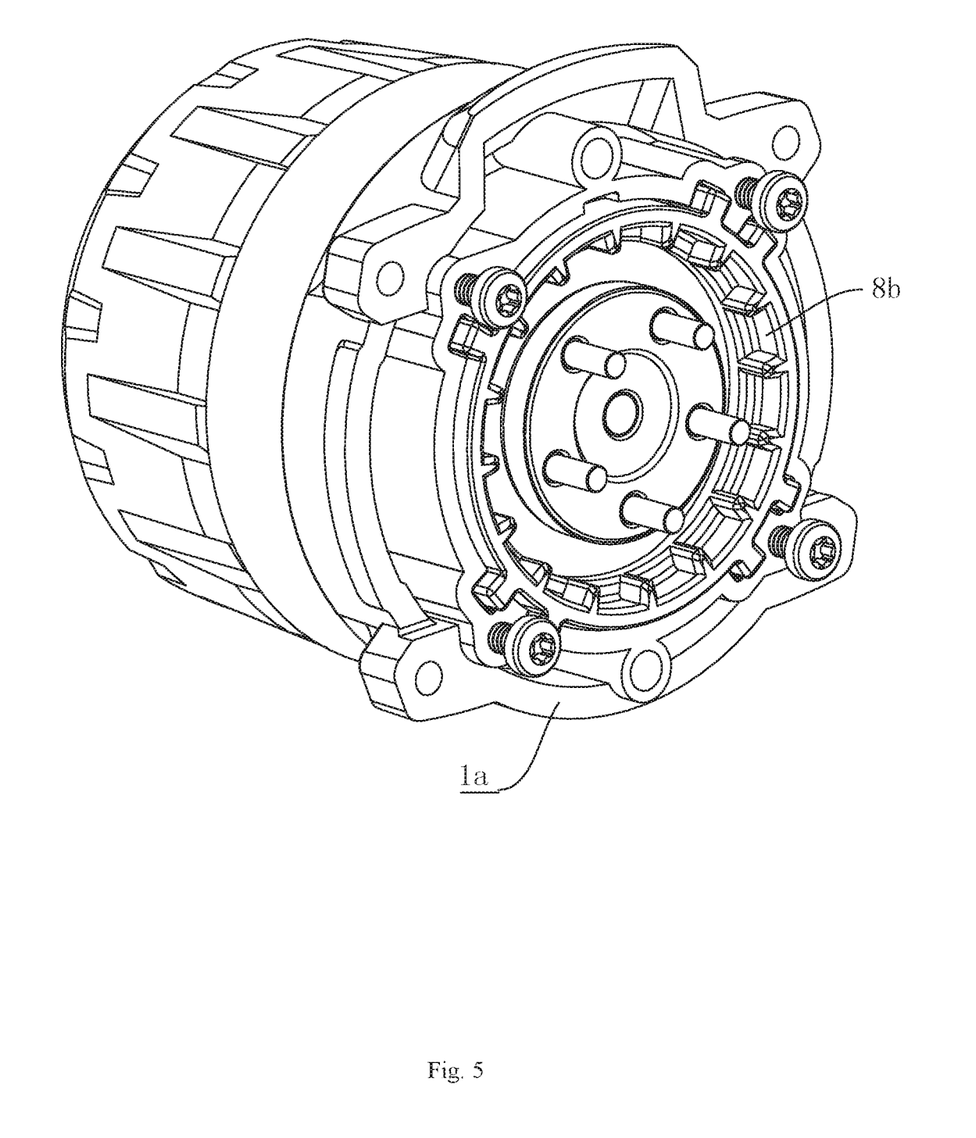
FIG. 5 is a partial schematic structural diagram of the transmission system according to embodiment 1.

In addition, as shown in FIG. 4 and FIG. 5, there is a locking structure between the outer peripheral surface of the first inner gear 6 and the inner side of the front housing body 1a, and the locking structure mainly comprises a plurality of lugs 8a evenly distributed on the peripheral surface of the first inner gear 6 and sliding groove 8b located on the inner side of the front housing body 1a and matched with the lugs 8a. When the first inner gear 6 is completely sleeved outside the first planetary gear set 5, the lugs 8a can be inserted into the sliding groove 8b, thus realizing the locking between the first inner gear 6 and the housing 1. When the first inner gear 6 is sleeved on the first planetary gear set 5 and the first outer ring gear 4a at the same time, the lugs 8a disengage from the sliding groove 8b, thus realizing the unlocking between the first inner gear 6 and the front housing body 1a. In addition, the first inner gear 6 is also sleeved with a gear sleeve 7. Here, the first inner gear 6 and the gear sleeve 7 are fixed in the axial direction, while the first inner gear 6 can rotate in the circumferential direction. When the first inner gear 6 is completely sleeved on the first planetary gear set 5, the first planetary gear set 5 rotates on its axis and revolves around the first inner ring gear 4b, at this point, the revolution angular velocity of the first planetary gear set 5 is smaller than the rotation angular velocity of the double-layer gear 4. When the first inner gear 6 is sleeved outside the first planetary gear set 5 and the first outer ring gear 4a at the same time, the first inner gear 6, the double-layer gear 4 and the first planetary gear set 5 are locked, at this point, the first planetary gear set 5 only revolves. At this point, the revolution angular velocity of the first planetary gear set 5 is equal to the rotation angular velocity of the double-layer gear 4. In this way, speed change of the transmission system can be realized by the sliding switch of the first inner gear 6 between the first planetary gear set 5 and the first outer ring gear 4a.

Figure 6:
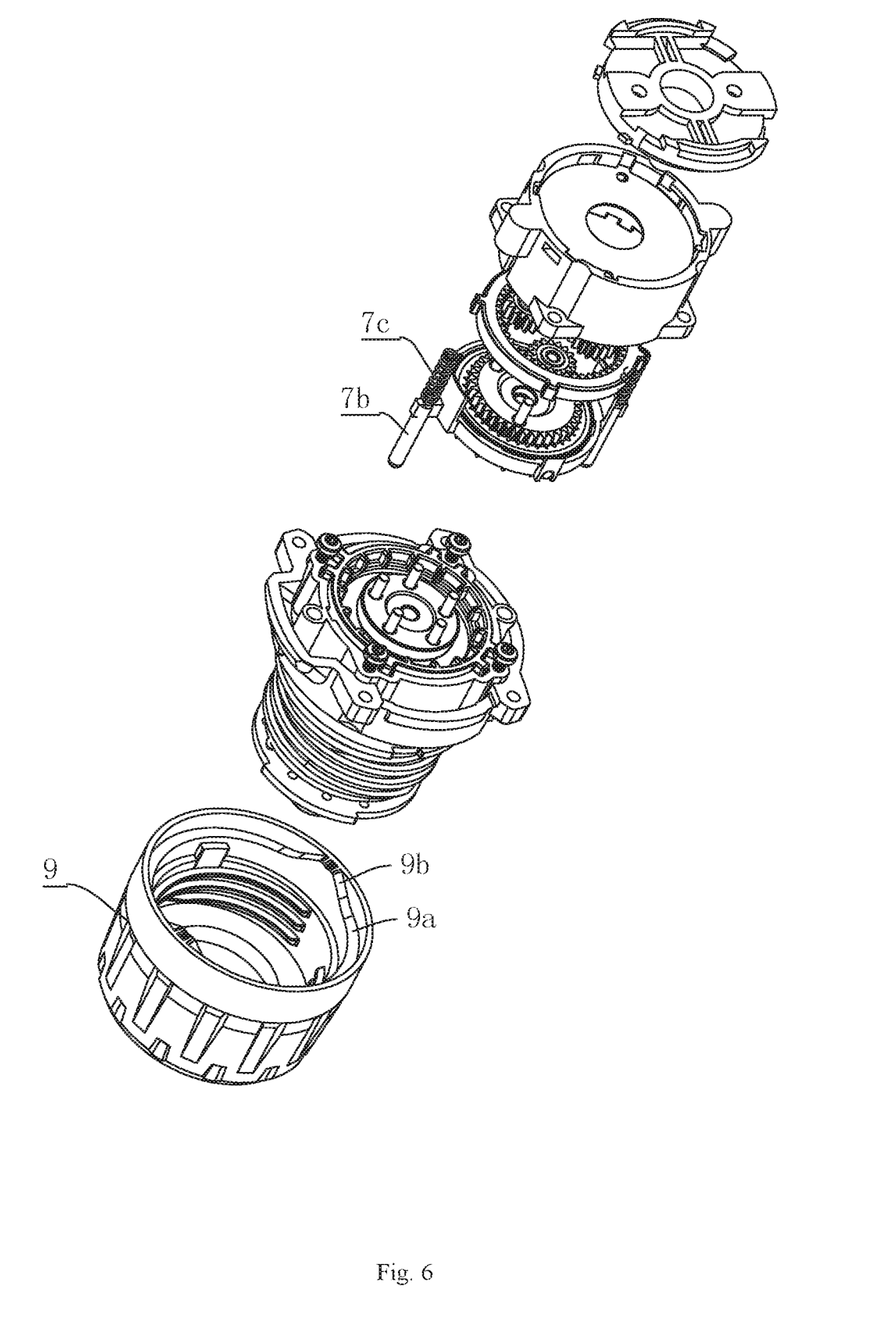
FIG. 6 is a fourth explosive view of the transmission system according to embodiment 1.

Meanwhile, as shown in FIG. 6, the outer peripheral surface of the gear sleeve 7 is provided with fixing blocks 7a, and the number of the fixing blocks 7a can be determined according to the actual situation. Here, the number of the fixing blocks 7a is two, and the fixing blocks 7a are evenly distributed around the center of the gear sleeve 7. Each fixing block 7a is provided with a lifting pin 7b, and the lifting pin 7b, the fixing block 7a and the gear sleeve 7 are integrally formed. In addition, the lifting pins 7b are arranged parallel to the axial direction of the gear sleeve 7. The end, facing the bottom cover 1c, of each lifting pin 7b is further sleeved with a biasing spring 7c, and one end of each biasing spring 7c abuts against the corresponding fixing block 7a. In addition, the outer peripheral surface of the rear housing body 1b is provided with first blind holes 1b1, and the other end of each biasing spring 7c abuts against the bottom of the corresponding first blind hole 1b1. In this way, on the one hand, the biasing springs 7c can support the lifting pins 7b, which is conducive to keeping the stress on the lifting pins 7b in balance, on the other hand, the first blind holes 1b1 can also limit the biasing springs 7c, thus reducing the damage caused by the torsion of the biasing springs 7c during stretching. Moreover, the outer peripheral surface of the front housing body 1a is also provided with guide holes 1a1, and the lifting pins 7b are inserted into the guide holes 1a1 and can slide in the guide holes 1a1. Thus, the guide holes 1a1 can protect the lifting pins 7b and guide the lifting pins 7b to slide in an accurate direction.

Furthermore, the side, away from the bottom cover 1c, of the front housing body 1a is also provided with a torque cup 9, and the inner peripheral surface of the torque cup 9 is provided with an inner edge 9a. The inner edge 9a is provided with protrusions 9b corresponding to the lifting pins 7b, and the transition between the protrusions 9b and the inner edge 9a is continuous and natural. When the torque cup 9 is rotated till the protrusions 9b come into contact with the ends of the lifting pins 7b, the protrusions 9b start to push the lifting pins 7b by continuing to rotate the torque cup 9. Accordingly, the lifting pins 7b slide toward the side of the bottom cover 1c and drive the first inner gear 6 to slide to the position where the first inner gear 6 is simultaneously sleeved on the first outer ring gear 4a and the first planetary gear set 5. This also realizes the process of controlling the speed increase of the transmission system through the torque cup 9. Furthermore, when the torque cup 9 is rotated reversely, the acting force of the protrusions 9b on the lifting pins 7b will be removed, so that the lifting pins 7b can reset under the action of the biasing springs 7c, thus realizing the speed decrease of the transmission system.

Figure 7:
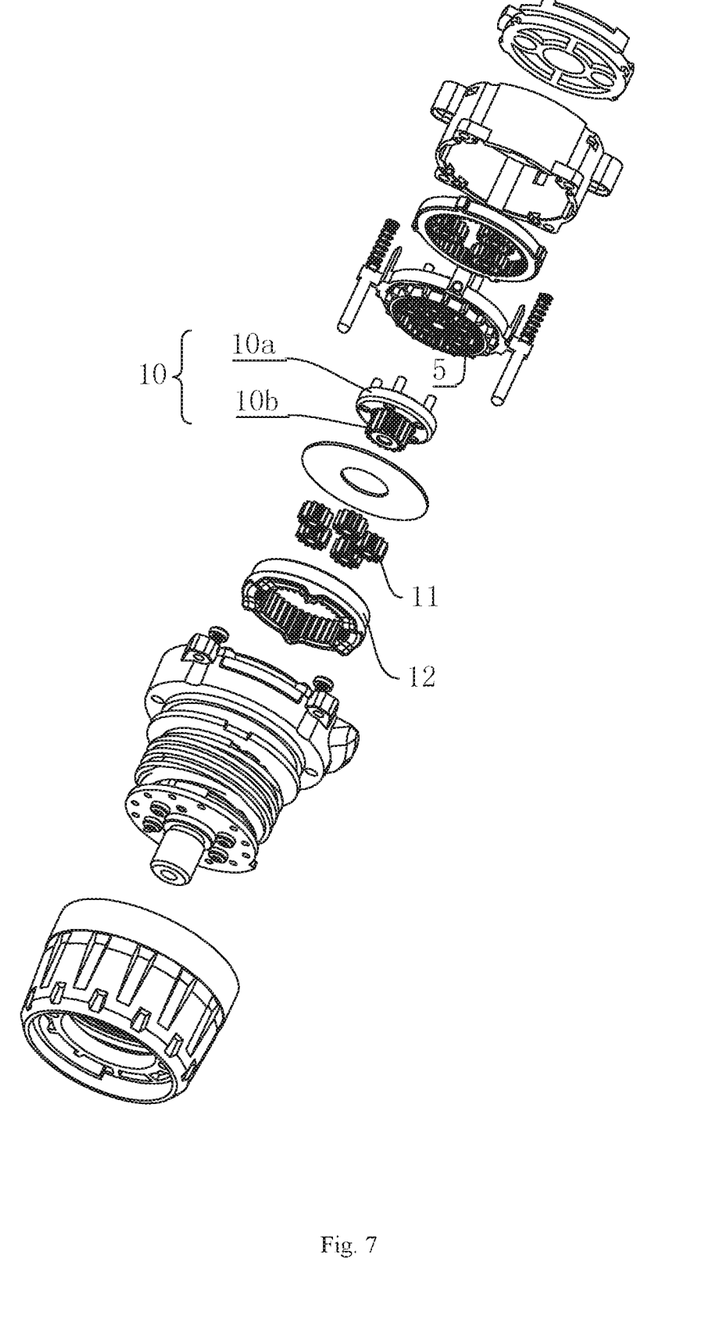
FIG. 7 is a fifth explosive view of the transmission system according to embodiment 1.

In addition, as shown in FIG. 7, the front housing body 1a is internally provided with a sun gear 10 which is composed of a disk 10a and a second inner ring gear 10b coaxial with the disk 10a. Here, shafts of the planetary gears of the first planetary gear set 5 are all arranged on the side, away from the second inner ring gear 10b, of the disc 10a in a inserting mode, and the planetary gears are evenly distributed around the center of the sun gear 10. A third planetary gear set 11 is evenly distributed around the second inner ring gear 10b, and each planetary gear of the third planetary gear set 11 meshes with the second inner ring gear 10b. In addition, the third planetary gear set 11 is sleeved with a third inner gear 12 which meshes with each planetary gear of the third planetary gear set 11.

Figure 8:
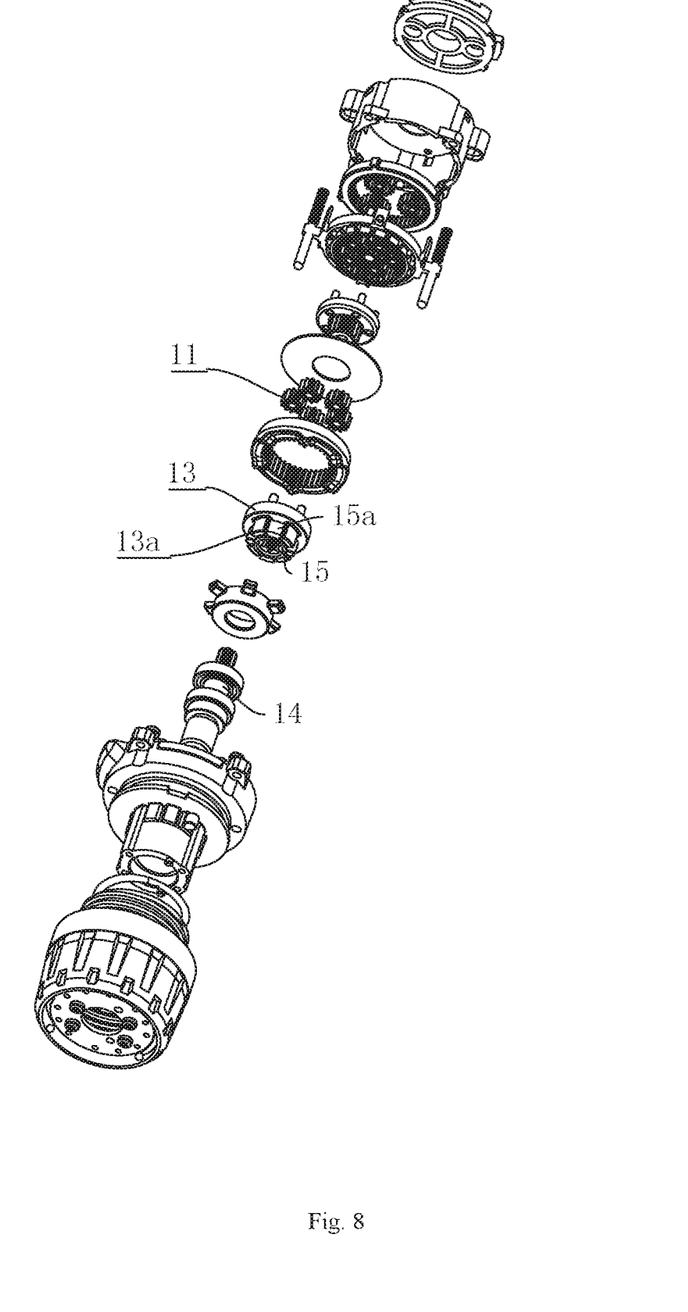
FIG. 8 is a sixth explosive view of the transmission system according to embodiment 1.

As shown in FIG. 8, shafts of the planetary gears of the third planetary gear set 11 are uniformly distributed around the center of a transmission ring 13 in the circumferential direction and are arranged on the transmission ring 13 in a penetrating mode, and the transmission ring 13 is coaxial with the through hole 1c1. First limiting blocks 13a are evenly distributed on the side, away from the third planetary gear set 11, of the transmission ring 13. The end of the mounting shaft 14 is provided with a shaft sleeve 15, the mounting shaft 14 and the shaft sleeve 15 are locked in the circumferential direction, that is, the end of the mounting shaft is hexagonal, the inner ring of the shaft sleeve is also hexagonal, and the two are matched with each other. The circumferential surface of the shaft sleeve 15 is provided with clamping blocks 15a matched with the first limiting blocks 13a, and the clamping blocks 15a can be embedded between two adjacent first limiting blocks 13a, so that the transmission ring 13, the sleeve 15 and the mounting shaft 14 are relatively stationary.

Figure 9:
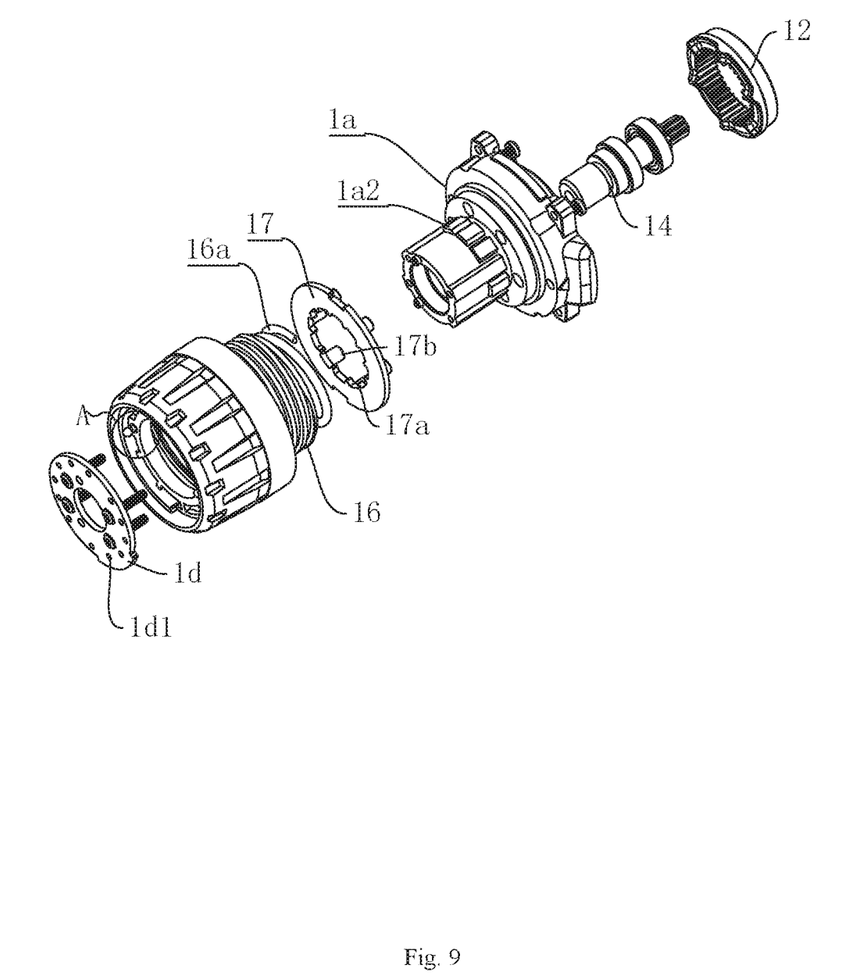
FIG. 9 is a seventh explosive view of the transmission system according to embodiment 1.

As shown in FIG. 9, the mounting shaft 14 extends into the front housing body 1a and is fixed in the front housing body 1a through two bearings. In addition, the front housing body 1a is sleeved with a thread bushing 16 on the outer peripheral surface where the mounting shaft 14 is located. Here, the outer side of the thread bushing 16 is matched with the inner side of the torque cup 9 through threads. The front housing body 1a is further sleeved with a torque washer 17 at the side end, facing the bottom cover 1c, of the thread bushing 16. Here, the inner ring of the torque washer 17 is provided with teeth 17a, and the front housing body 1a is provided with second limiting blocks 1a2 on the inner side of the thread bushing 16. The second limiting blocks 1a2 are evenly distributed along the axial center of the front housing body 1a, and the second limiting blocks 1a2 are arranged along the axial direction of the mounting shaft 14. The second limiting blocks 1a2 can just pass through the space between two adjacent teeth 17a. At the same time, lifting rods 17b are evenly distributed in the circumferential direction on the side, facing the bottom cover 1c, of the torque washer 17, one end of each lifting rod 17b is fixed to the torque washer 17, and the other end of each lifting rod 17b abuts against the surface of the third inner gear 12. In addition, the lifting rods 17b extends into the front housing body 1a.

Figure 10:
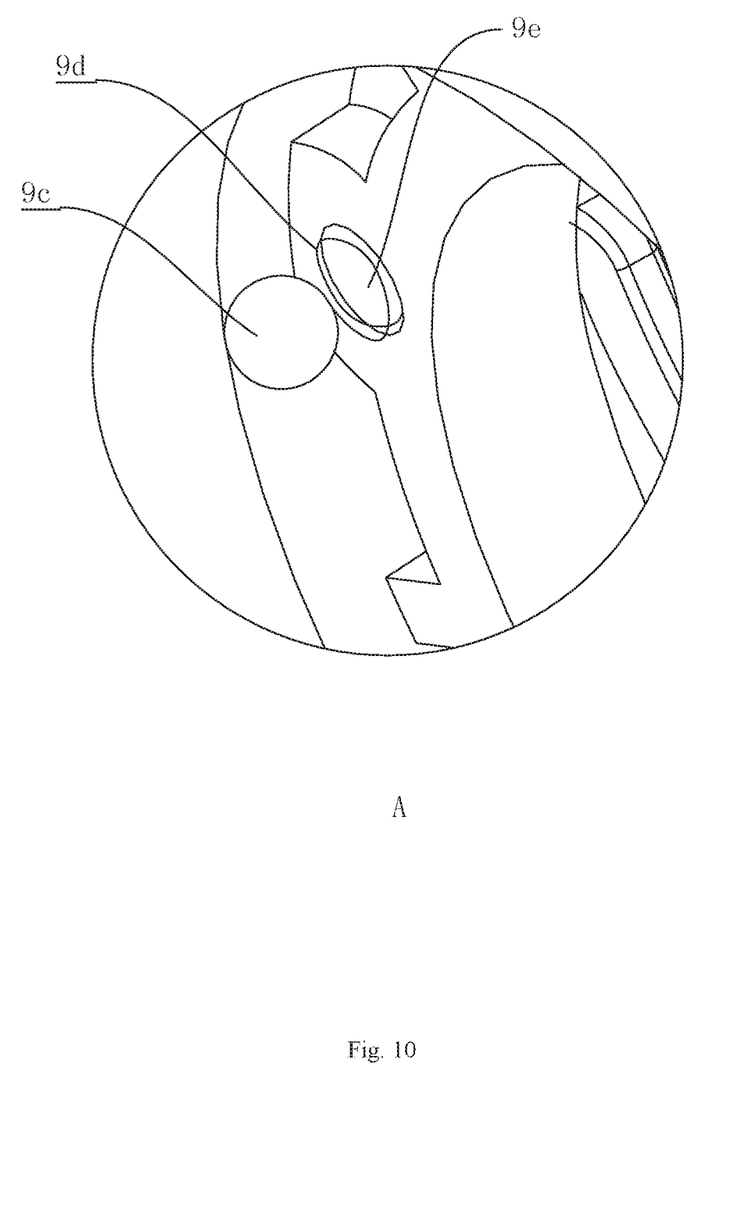
FIG. 10 is an enlarged view of a part A of FIG. 9.

In addition, as shown in FIG. 9 and FIG. 10, first extension springs 16a are arranged between the inner side of the thread bushing 16 and the outer side of the front housing body 1a. One end of each first extension spring 16a abuts against the bottom of the thread bushing 16, and the other end abuts against the torque washer 17. The side, away from the thread bushing 16, of the bottom of the torque cup 9 is provided with a front cover 1d which is fixed to the front housing body 1a through a bolt. In addition, a plurality of limiting holes 1d1 are distributed around the center of the front cover 1d, and the number of the limiting holes 1d1 can be set according to the actual situation. The side, facing the front cover 1d, of the torque cup 9 is provided with steel balls 9c matched with the limiting holes 1d1. The number of the steel balls 9c can be determined according to the actual situation, and the steel balls 9c are symmetrical about the axial center of the torque cup 9. In addition, the steel balls 9c abut against the bottom of the torque cup 9 through second extension springs 9d, and the bottom of the torque cup 9 is provided with second blind holes 9e. Each second extension spring 9d abuts against the bottom of the corresponding second blind hole 9e. Through the interference fit between the steel balls 9c and the different limiting holes 1d1, workers can select different gear positions conveniently.

Working principle of the transmission system: based on low-speed operation, the output shaft of the motor first drives the second planetary gear set 2 through gears to rotate on its axis and revolve at the same time. Since the shafts of the planetary gears of the second planetary gear set 2 are fixed to a first outer ring gear 4a of the double-layer gear 4, the second planetary gear set 2 will drive the double-layer gear 4 to rotate on its axis. When the double-layer gear 4 rotates on its axis, the first inner ring gear 4b will drive the first planetary gear set 5 to rotate on its axis and revolve. Since the first planetary gear set 5 is arranged on the sun gear 10 in a penetrating mode, the first planetary gear set 15 will drive the sun gear 10 to rotate on its axis. The second inner ring gear 10b of the sun gear 10 will drive the third planetary gear set 11 to rotate on its axis and revolve. Since the third planetary gear set 11 is arranged on the transmission ring 13 in a penetrating mode, the transmission ring 13 will be driven to rotate on its axis, so as to drive the mounting shaft 14 to rotate on its axis through the shaft sleeve 15. Due to the low-speed state, a screwdriver bit can be installed at the end of the mounting shaft 14 to screw bolts or screws.

Torque adjustment: in order to increase the torque of screwing, workers can screw the torque cup 9, and the thread bushing 16 will move toward the side of the bottom cover 1c under the action of the screw of the torque cup 9, so that the thread bushing 16 will compress the first extension springs 16a. Then the first extension springs 16a exert pressure on the torque washer 17, and the torque washer 17 exerts pressure on third inner gear 12 through the lifting rods 17b. When the first extension springs 16a are pressed more tightly, the third inner gear 12 will be more fixed firmly, and thus the torque will be greater.

Speed increasing process of the transmission system: when the torque cup 9 is reversely screwed, the pressure of the thread bushing 16 putting on the first extension springs 16a will decrease, and the protrusions 9b on the inner edge 9a will gradually make contact with the ends of the lifting pins 7b; when the protrusions 9b push the lifting pins 7b, the torque of the transmission system is the smallest, at this point, the lifting pins 7b will push the first inner gear 6 to move till the first inner gear 6 is directly sleeved on the first planetary gear set and the first outer ring gear 4a, so that the first planetary gear set, the first outer ring gear 4a and the first inner gear 6 are locked. At this point, the rotation angular velocity of the double-layer gear 4 is equal to the rotation angular velocity of the sun gear 10, thus realizing the function of increasing speed. In this way, in the case of small torque and high rotating speed, drilling can be conducted as long as a drill bit is installed at the end of the mounting shaft 14.

The matching process of the steel balls 9c and the different limiting holes 1d1 allows positioning workers to adjust to the required positions, and can also avoid the out-of-gear event.

Embodiment 2

Figure 11:
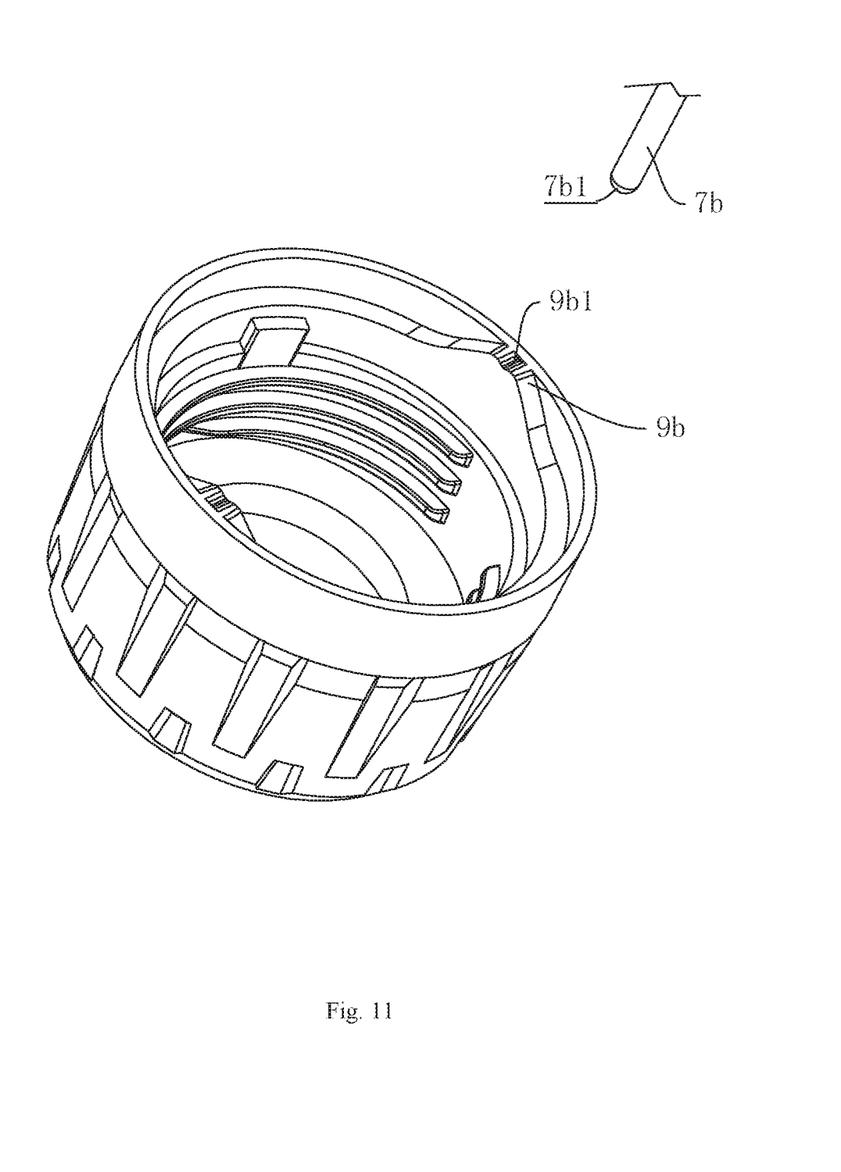
FIG. 11 is a structural view of a torque cup and a lifting pin of embodiment 2.

A transmission system, as shown in FIG. 11, is based on embodiment 1, the side, facing the corresponding lifting pin 7b, of each protrusion 9b is provided with a concave cambered surface 9b1, and the end of each lifting pin 7b is a spherical surface 7b1. Here, each concave cambered surface 9b1 is matched with the end of the corresponding lifting pin 7b, so that when the protrusions 9b push the lifting pins 7b, the concave cambered surfaces 9b1 restrain the lifting pins 7b, thus effectively ensuring the restriction of the concave cambered surfaces 9b1 to the lifting pins 7b and avoiding the out-of-gear event during high-speed output of the transmission system.

Embodiment 3

Figure 12:
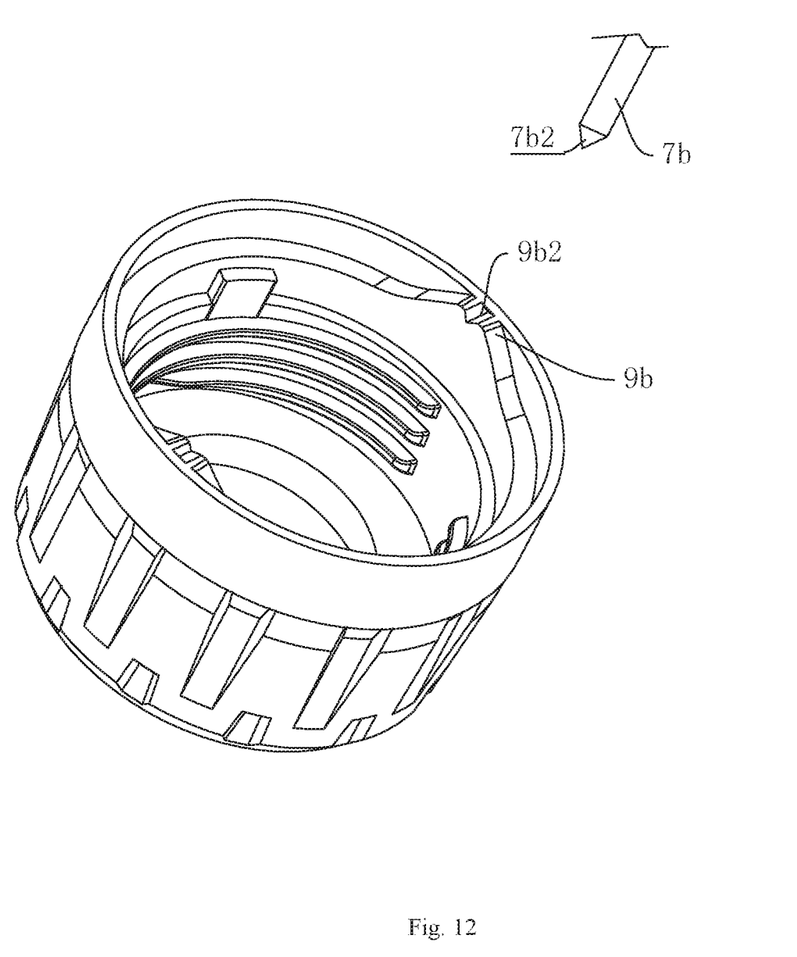
FIG. 12 is a structural view of a torque cup and a lifting pin of embodiment 3.

A transmission system, as shown in FIG. 12, differs from embodiment 2 only in that the side, facing the corresponding lifting pin 7b, of each protrusion 9b is provided with a tapered groove 9b2, and the end of each lifting pin 7b is tapered 7b2. In this way, each tapered groove 9b2 can be matched with the end of the corresponding lifting pin 7b, so that on the one hand, the lifting pins 7b can smoothly slide into the tapered grooves 9b2, and on the other hand, the tapered grooves 9b2 can limit the lifting pins 7b, thus ensuring that the lifting pins 7b and the protrusions 9b can remain stable during high-speed output of the transmission system.

Embodiment 4

Figure 13:
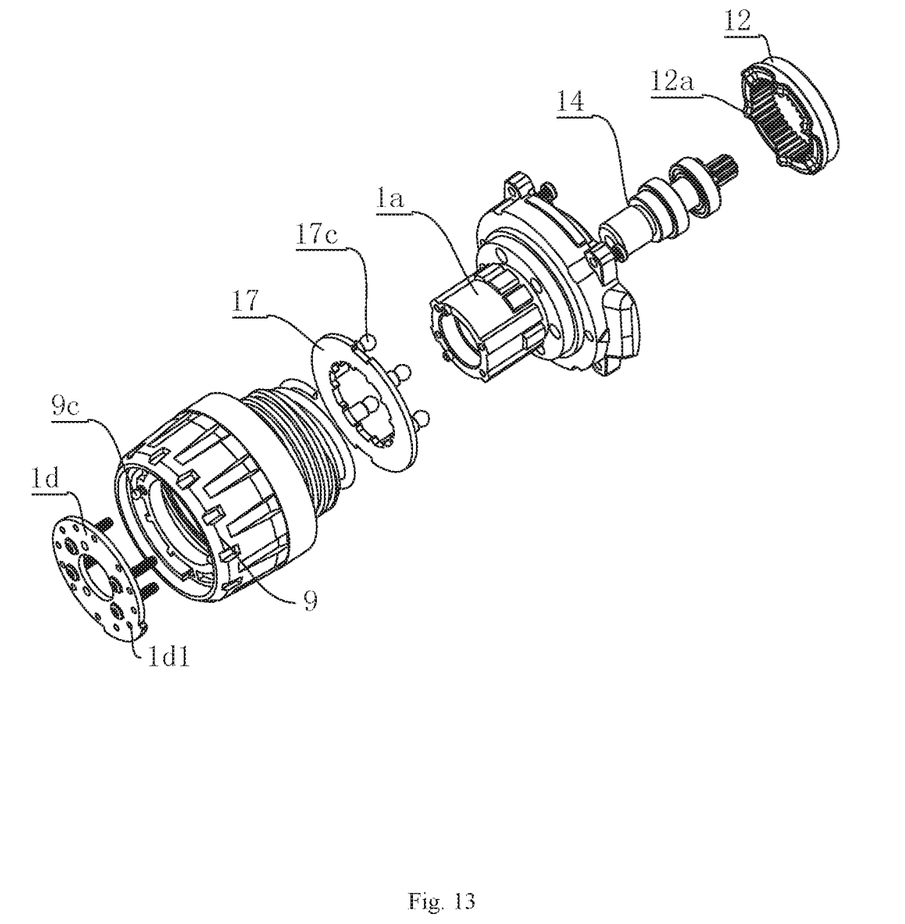
FIG. 13 is a partial schematic structural diagram of a transmission system according to embodiment 4.
Figure 14:
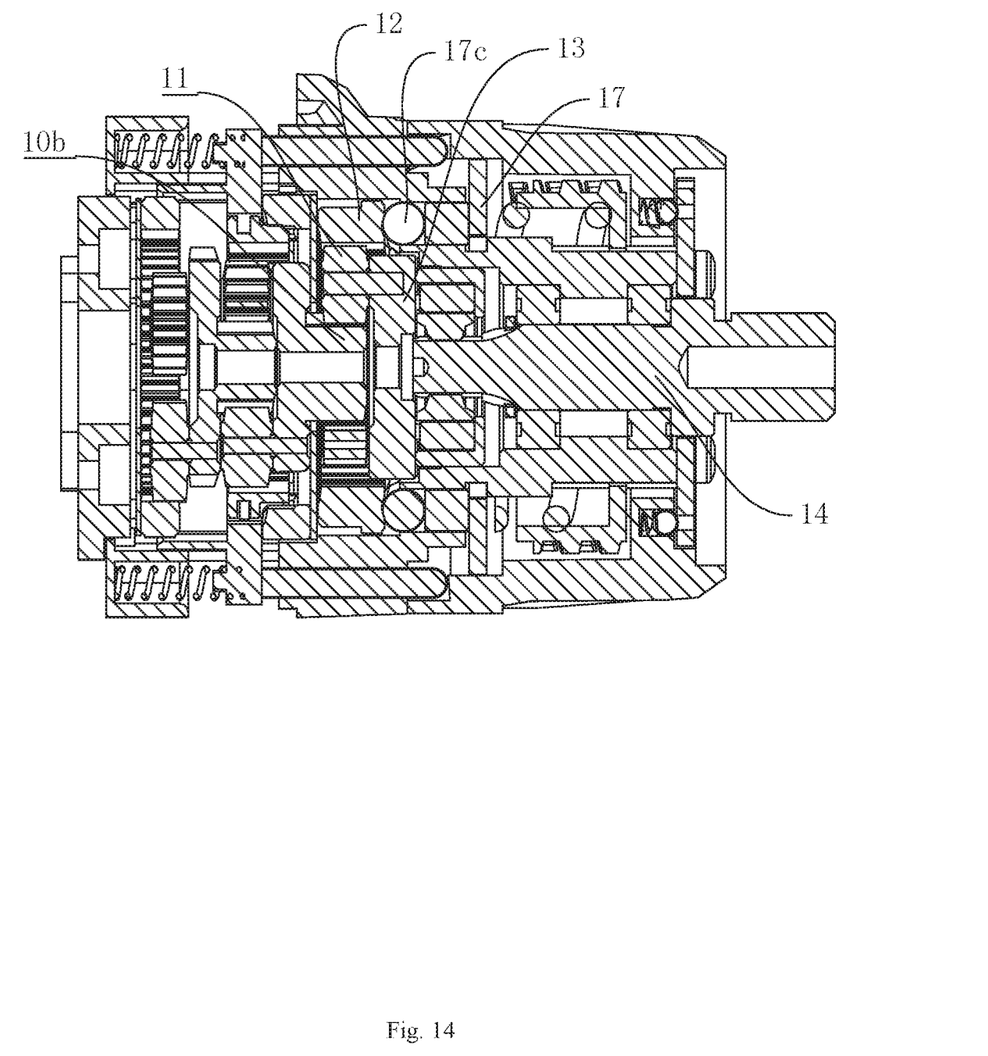
FIG. 14 is a sectional view of the transmission system according to embodiment 4.

A transmission system, as shown in FIG. 13 and FIG. 14, is based on embodiment 1, projection 12a are evenly distributed on the side, facing the lifting rods 17b, of the third inner gear 12 along the axial center of the third inner gear, the end of each lifting rod 17b contacts with a ball 17c, and the balls 17c are limited in the front housing body 1a. When the resistance on the mounting shaft 14 is greater than the torque of the transmission system, the transmission ring 13 will be locked, that is, it will not rotate on its axis. However, the third planetary gear set 11 located on the transmission ring 13 will still rotate on its axis under the action of the second inner ring gear 10b of the sun gear 10 and drive the third inner gear 12 sleeved outside to rotate. When the projection 12a pass through the balls 17c, the lifting rods 17b push up the torque washer 17 so that the third inner gear 12 can rotate, thus realizing the function of shaft disengagement.

In addition, here, the number of the limiting holes 1d1 of the front cover 1d is twelve, the limiting holes are equally divided into two groups, the two groups of limiting holes 1d1 are symmetrical about the center of the front cover 1d, the number of the steel balls 9c is two, and the steel balls are symmetrical about the center of the torque cup 9. The two groups of limiting holes 1d1 are equally divided into an equal number of low-speed gears and an equal number of high-speed gears, and there are four low-speed gears and two high-speed gears. Meanwhile, the limiting holes 1d1 of the low-speed gears are located on the front cover 1d corresponding to the middle position of two adjacent teeth 17a, while the limiting holes 1d1 of the high-speed gears are not located on the front cover 1d corresponding to the middle position of two adjacent teeth 17a.

When the transmission system is in a low gear, that is, when the steel balls 9c are engaged with the limiting holes 1d1 of the low-speed gears, then the teeth 17a is corresponding to the gap between the limiting blocks 1a2. If the mounting shaft 14 is locked due to excessive resistance, the teeth 17a of the torque washer 17 can smoothly slide between two second limiting blocks 1a2 while the projection 12a push up the lifting rods 17b, thus normally realizing the process of shaft disengagement for avoiding danger. When the transmission system is in a high gear, the teeth 17a are blocked by the second limiting blocks 1a2, which prevents the torque washer 17 from being pushed up by the projection 12a, however, the resistance is not very large during this process, so that shaft disengagement does not occur, and thus the drilling process can proceed normally.

Embodiment 5

An electric tool is disclosed. A transmission system for the electric tool is a transmission system recorded in any one of the embodiments 1 to 4 of the invention.

The specific embodiments are only an explanation of the invention, but not a limitation to the invention. After reading this specification, a person skilled in the art can make modifications to the embodiments without creative contribution as needed, however, as long as they are within the scope of the claims of the invention, they are protected by the patent law.

The invention claimed is:

1. A transmission system, comprising:
a housing (1);
a double-layered gears (4) for transmitting a power from a motor to a mounting shaft (14) for clasping a screw driver bit or a drill bit and defining a transmission axis, the double-layered gears (4) comprising a first outer or bigger gear (4a) and a first inner or smaller gear (4b);
a torque cup (9) mounted to the housing to cover an leading end portion of the housing through which the mounting shaft is extended partially outside the housing;
a first set of planetary gears (5) for driving the mounting shaft, circumferentially regularly surrounding and meshing the first inner gear (4b),
a first ring gear (6) fixed circumferentially and relatively to the housing so that it can slide axially to mesh both of the first outer gear (4a) and the first set of planetary gears (5) or only the former;
wherein the torque cup (9) is configured so that it can be turned to force the first ring gear (6) to slide axially.

2. The transmission system according to claim 1, further comprising:
a sun gear (10) rotatable around the transmission axis and having an axial end fixed with a plurality of axial stubs each of which co-axially supports one of the first set of planetary gears (5) for rotation around itself; and
a second set of planetary gears (11) for driving the mounting shaft (14), meshing inwards with the sun gear (10) and outwards with a second ring gear (12), which is mounted to the housing for a rotation restrained with respect to the housing.

3. An electric tool comprising a transmission system according to claim 1.

4. The transmission system according to claim 1, wherein the first ring gear (6) is surrounded with a gear sleeve (7), and the gear sleeve (7) and the first ring gear (6) are axially locked; and the torque cup can be turned to force the gear sleeve (7) to slide axially.

5. The transmission system according to claim 4, further comprising:
a sun gear (10) rotatable around the transmission axis and having an axial end fixed with a plurality of axial stubs each of which co-axially supports one of the first set of planetary gears (5) for rotation around itself; and a second set of planetary gears (11) for driving the mounting shaft (14), meshing inwards with the sun gear (10) and outwards with a second ring gear (12), which is mounted to the housing for a rotation restrained with respect to the housing.

6. The transmission system according to claim 5, wherein the second ring gear is provided with an axial and endless profile or cam which is urged against the housing.

\* \* \* \* \*